US011990627B2

(12) United States Patent
Kakinuma et al.

(10) Patent No.: US 11,990,627 B2
(45) Date of Patent: May 21, 2024

(54) CARRIER METAL CATALYST, MANUFACTURING METHOD THEREOF, AND FUEL CELL

(71) Applicant: UNIVERSITY OF YAMANASHI, Yamanashi (JP)

(72) Inventors: Katsuyoshi Kakinuma, Yamanashi (JP); Makoto Uchida, Yamanashi (JP); Akihiro Iiyama, Yamanashi (JP)

(73) Assignee: UNIVERSITY OF YAMANASHI, Yamanashi (JP)

( * ) Notice: Subject to any disclaimer, the term of this patent is extended or adjusted under 35 U.S.C. 154(b) by 44 days.

(21) Appl. No.: 17/967,180

(22) Filed: Oct. 17, 2022

(65) Prior Publication Data
US 2023/0049745 A1 Feb. 16, 2023

Related U.S. Application Data

(63) Continuation of application No. 16/774,242, filed on Jan. 28, 2020, now Pat. No. 11,502,309.

(30) Foreign Application Priority Data

Jan. 30, 2019 (JP) ................................. 2019-013778

(51) Int. Cl.
*H01M 4/92* (2006.01)
*H01M 8/1004* (2016.01)

(52) U.S. Cl.
CPC ......... *H01M 4/925* (2013.01); *H01M 8/1004* (2013.01)

(58) Field of Classification Search
None
See application file for complete search history.

(56) References Cited

U.S. PATENT DOCUMENTS

2010/0233574 A1   9/2010   Masao et al.
2012/0295184 A1   11/2012  Watanabe et al.
(Continued)

FOREIGN PATENT DOCUMENTS

JP   2017157353 A   9/2017
WO   2009060582 A1  5/2009
(Continued)

OTHER PUBLICATIONS

Theophilos Ioannides et al., "Charge Transfer in Metal Catalysts Supported on Doped TiO2: A Theoretical Approach Based on Metal-Semiconductor Contact Theory", Journal of Catalysis 161, 560-569 (1996).
(Continued)

*Primary Examiner* — Sarah A. Slifka
(74) *Attorney, Agent, or Firm* — Maier & Maier, PLLC

(57) ABSTRACT

The carrier metal catalyst achieves suppression of internal resistance of a fuel cell. A carrier metal catalyst includes: a carrier powder; and metal fine particles supported on the carrier powder; wherein: the carrier powder is an aggregates of carrier fine particles; the carrier fine particles includes a chained portion structured by a plurality of crystallites being fusion bonded to form a chain; the carrier fine particles include titanium oxide; the carrier fine particles are doped with an element having a valence different from a valence of titanium; the titanium oxide of the carrier powder has an anatase phase/rutile phase ratio of 0.2 or lower; the metal fine particles have a mean particle size of 3 to 10 nm; the metal fine particles include platinum; and a cell resistance measured under standard conditions of a fuel cell prepared using the carrier metal catalyst is 0.090 $\Omega cm^{-2}$ or lower.

2 Claims, 17 Drawing Sheets

(56) References Cited

U.S. PATENT DOCUMENTS

2017/0250409 A1  8/2017  Kakinuma et al.
2018/0175397 A1  6/2018  Shintani et al.

FOREIGN PATENT DOCUMENTS

WO    2011065471 A1   6/2011
WO    2016/203679 A1  12/2016

OTHER PUBLICATIONS

Office Action mailed on Aug. 30, 2022 in corresponding Japanese Application No. 2019-013778; (5 pages, including English translation).

carrier metal catalyst 100 of Example 1 carrier metal catalyst 100 of Example 2

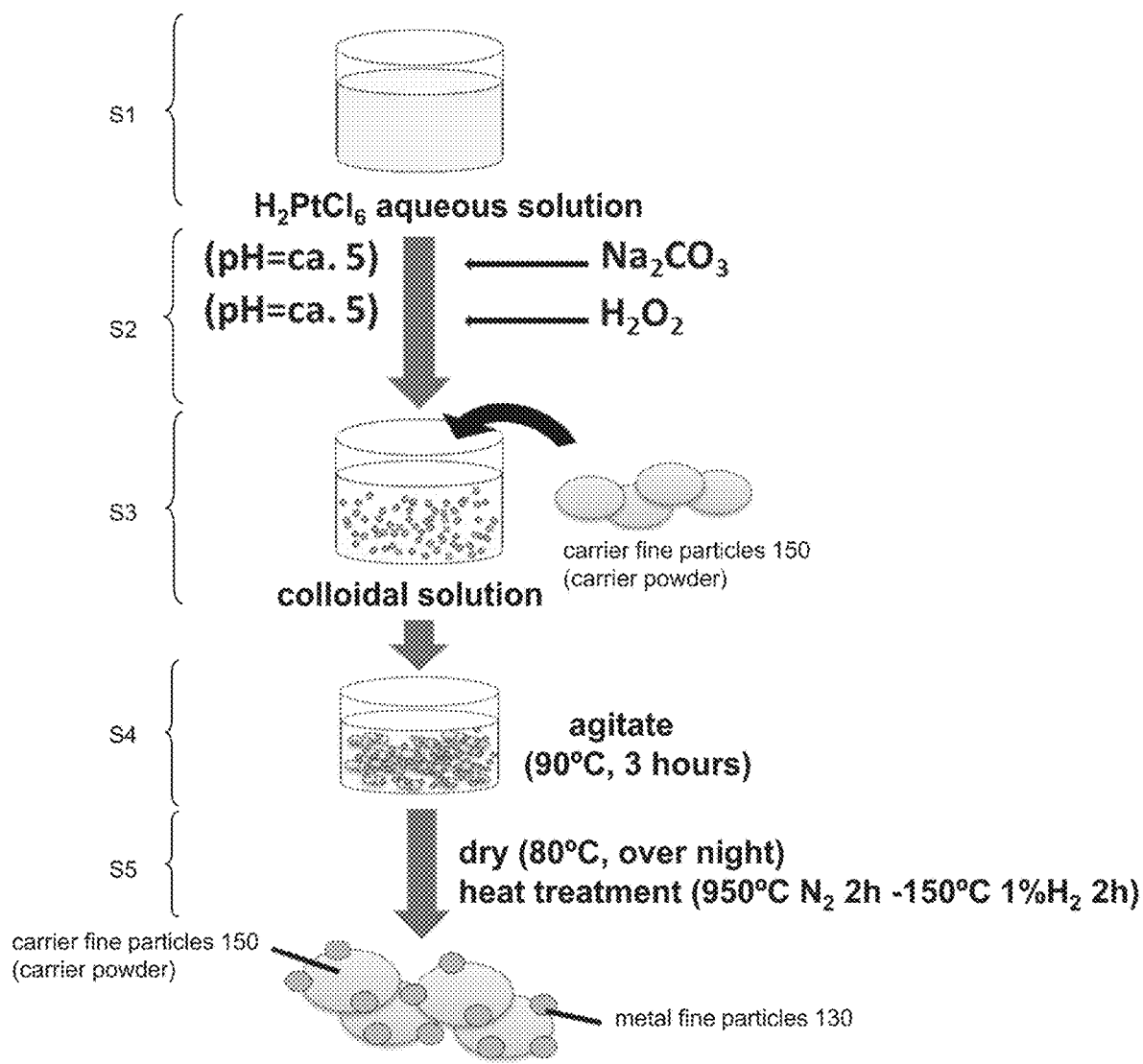

Fig. 14    Polarization curves (IR-free) and Ohmic resistance
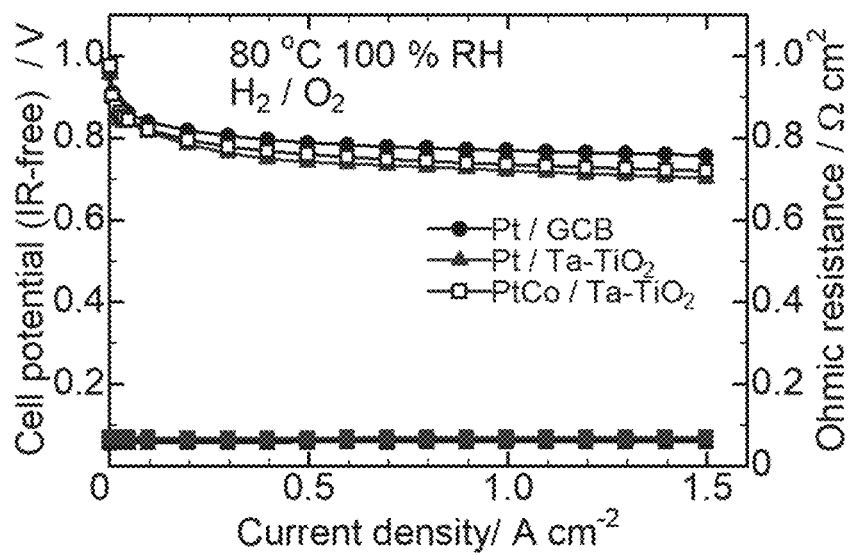

Schematic drawings of device configurations for
H₂ pump measurement

Hydrogen oxidation polarization curve (IR-free)
(80° C, 100 %RH)

CARRIER METAL CATALYST, MANUFACTURING METHOD THEREOF, AND FUEL CELL

CROSS-REFERENCE TO RELATED APPLICATIONS

This is a continuation of U.S. application Ser. No. 16/774,242, filed on Jan. 28, 2020, which claims benefit of priority to Japanese Patent Application No. 2019-013778, filed on Jan. 30, 2019. The entire contents of these applications are hereby incorporated by reference.

FIELD OF THE INVENTION

The present invention relates to a carrier metal catalyst and a manufacturing method thereof. The carrier metal catalyst of the present invention is suitably used as an anode electrode catalyst of a fuel cell.

BACKGROUND OF THE INVENTION

Patent Literature 1 discloses usage of a carrier metal catalyst prepared by allowing a metal catalyst to be supported on a support structured with titanium oxide doped with a dissimilar metal.

PRIOR ART DOCUMENTS

Patent Literature

[Patent Literature 1] WO 2016/203679

Non-Patent Literature

[Non-Patent Literature 1] Journal of catalysis 161, 560-569 (1996): Charge Transfer in Metal Catalysts Supported on Doped $TiO_2$: A Theoretical Approach Based on Metal-Semiconductor Contact Theory

SUMMARY OF INVENTION

Technical Problem

However, the fuel cell of Patent Literature 1 cannot be regarded as having sufficiently low internal resistance, and thus reduction of internal resistance is desired.

The present invention has been made by taking these circumstances into consideration. An object of the present invention is to provide a carrier metal catalyst which can reduce internal resistance of the fuel cell.

Means to Solve the Problem

According to the present invention, a carrier metal catalyst, comprising: a carrier powder; and metal fine particles supported on the carrier powder; wherein: the carrier powder is an aggregates of carrier fine particles; the carrier fine particles comprise a chained portion structured by a plurality of crystallites being fusion bonded to form a chain; the carrier fine particles include titanium oxide; the carrier fine particles are doped with an element having a valence different from a valence of titanium; the titanium oxide of the carrier powder has an anatase phase/rutile phase ratio of 0.2 or lower; the metal fine particles have a mean particle size of 3 to 10 nm; the metal fine particles include platinum; and a cell resistance measured under standard conditions of a fuel cell prepared using the carrier metal catalyst is 0.090 $\Omega \cdot cm^2$ or lower; is provided.

When the tetravalent titanium ($Ti^{4+}$) in the titanium oxide ($TiO_2$) is reduced to $Ti^{3+}$, conductivity is obtained. On the surface of the support, $Ti^{3+}$ is localized in a region at the vicinity of the metal fine particles. The larger the area of the $Ti^{3+}$ region, the conductivity of the carrier metal catalyst increases, thereby reducing the internal resistance of the fuel cell using such carrier metal catalyst.

The present inventors have conducted intensive research, and have found that when the heat treatment after allowing the metal colloidal particles to be adsorped onto the support is carried out at a temperature of 920° C. or higher, the area of $Ti^{3+}$ becomes larger, thereby increasing conductivity of the carrier metal catalyst. In addition, when the heat treatment is carried out at a temperature exceeding 1100° C., the metal fine particles would aggregate on the support and becomes large, thereby increasing the distance between the metal fine particles. As a result, the conductivity of the carrier metal catalyst is decreased.

From these knowledge, it became apparent that carrier metal catalyst in which the mean particle size of the metal fine particles is 3 to 10 nm and the cell resistance measured under standard conditions is 0.09 $\Omega \cdot cm^2$ or lower can be obtained when the heat treatment is carried out in a temperature range of 920 to 1100° C., thereby leading to completion of the invention.

Here, when the heat treatment after allowing the metal colloidal particle to be adsorped onto the support is carried out at a temperature of 900° C. as in Patent Literature 1, the area of $Ti^{3+}$ region was not sufficiently large, and thus the cell resistance measured under standard conditions was 0.10 $\Omega \cdot cm^2$ or higher.

BRIEF DESCRIPTION OF THE DRAWINGS

The above further objects, features and advantages of the present invention will become more apparent from the following detailed description taken in conjunction with the accompanying drawings, wherein:

FIG. 12 is a flow of supporting step and reduction step of metal fine particles 130.

FIG. 14 shows a result of measurement of I-V characteristics and cell resistance.

DESCRIPTION OF THE PREFERRED EMBODIMENTS

Hereinafter, embodiments of the present invention will be explained with reference to the drawings. Various distinctive features shown in the following embodiments can be combined with each other. In addition, an invention can be established independently for each of the distinctive features.

1. Carrier Metal Catalyst 100

As shown in FIGS. 1 to 4, the carrier metal catalyst 100 comprises a carrier powder which is an aggregate of carrier fine particles having a chained portion structured by fusion bonding a plurality of crystallites 120 into a chain, and metal fine particles 130 being supported on the carrier powder.

A cell resistance measured under standard conditions of a fuel cell prepared using the carrier metal catalyst 100 is 0.090 $\Omega\cdot cm^2$ or lower, preferably 0.085 $\Omega\cdot cm^2$ or lower, more preferably 0.080 $\Omega\cdot cm^2$ or lower, further preferably 0.075 $\Omega\cdot cm^2$ or lower, and even preferably 0.070 $\Omega\cdot cm^2$ or lower. The lower limit of the cell resistance is not particularly limited, and is, for example, 0.010 $\Omega\cdot cm^2$. Standard conditions will be explained in detail in the Examples.

Hereinafter, each of the constituents will be explained.

1-1. Carrier Fine Particles 150 and Carrier Powder

Figure 1:
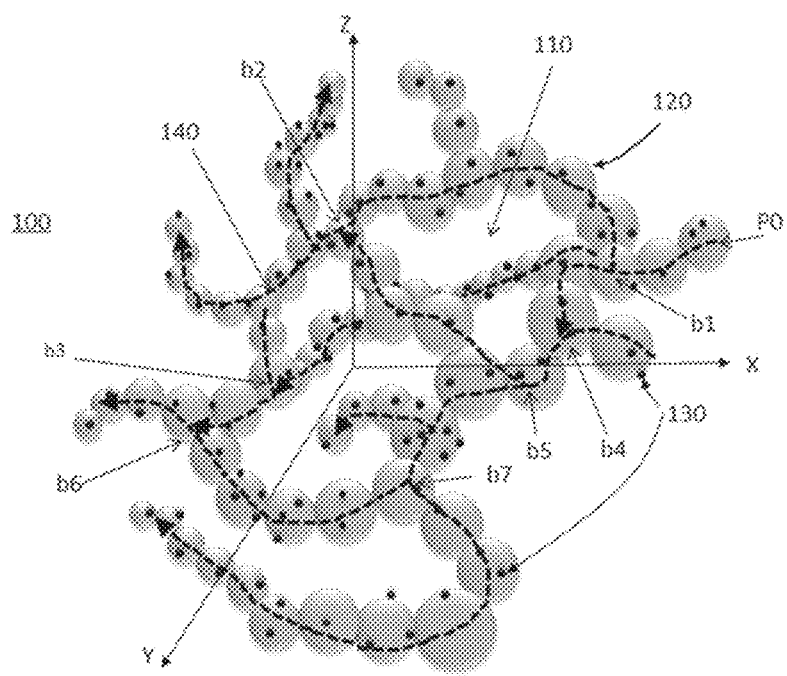
FIG. 1 is a model diagram of a catalyst structure of carrier metal catalyst 100.

As shown in FIG. 1, in the carrier fine particles 150, a three-dimensional gap 110 surrounded by the branch 160 and pores existing between a plurality of branches is formed. Here, a plurality of crystallites 120 structuring the carrier fine particles 150 is fusion bonded to form a chained portion, thereby forming the branch 160. Gas diffusion route to diffuse and transfer oxygen as the oxidant and/or hydrogen as the fuel to the carrier metal catalyst 100 is formed by the three-dimensional arrangement of the carrier fine particles 150 described above.

Figure 2:
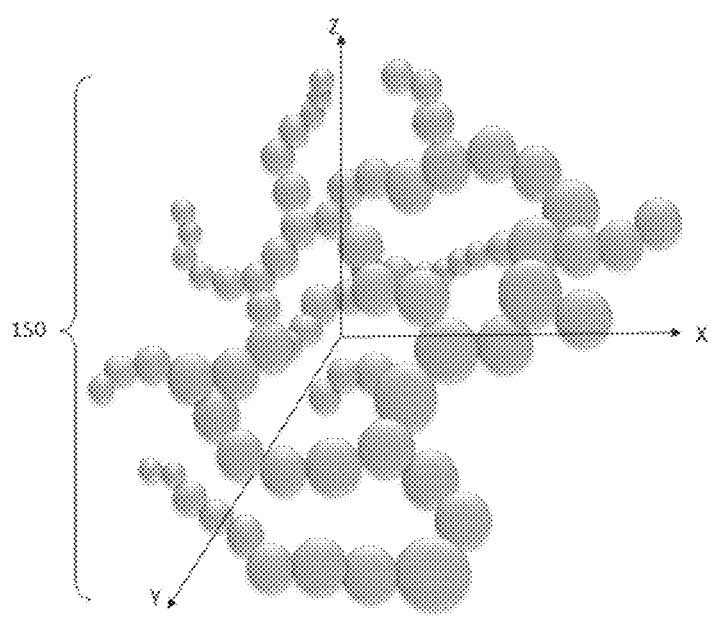
FIG. 2 shows a view in which carrier fine particles 150 are taken from FIG. 1.
Figure 3:
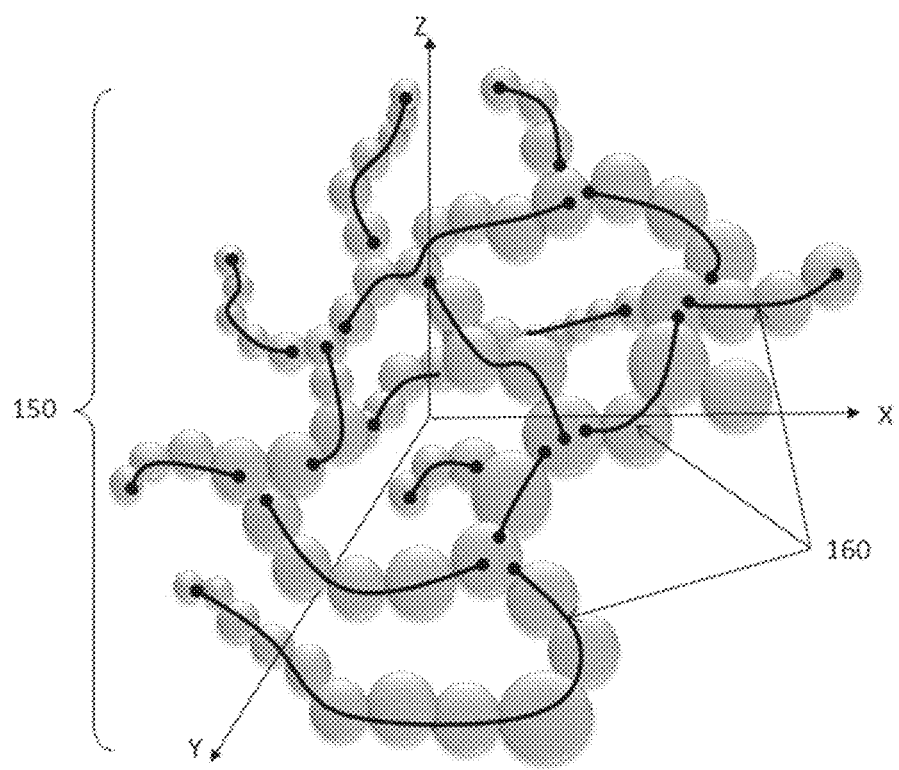
FIG. 3 shows a condition of branch 160 of the carrier fine particles 150 of FIG. 1.
Figure 4:
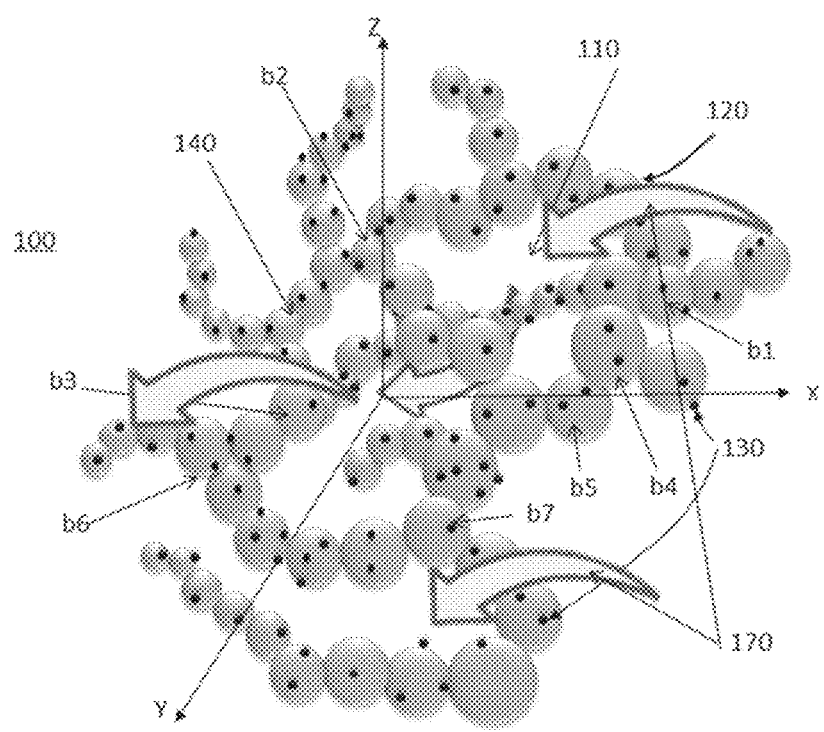
FIG. 4 shows a gas diffusion route of FIG. 1.

As shown in FIGS. 1 to 3 as an example of structure model of the carrier metal catalyst, the carrier fine particles 150 comprise four pores of a first pore surrounded by points b1, b2, b5, b4, and b1, where the branches link with each other (may be referred to as branching points, or merely as branch); a second pore surrounded by branching points b1, b2, b3, and b1; a third pore surrounded by branching points b2, b3, b6, b7, b5, and b2; and a fourth pore surrounded by branching points b1, b3, b6, b7, b5, b4, and b1. Here, when a plane surrounded by the branching points of each of the pores (first to fourth pores) is taken as the pore plane, the gap 110 is a three-dimensional space surrounded by the four pore planes. The carrier fine particles 150 comprise a plurality of pores surrounded by a plurality of branching points in which a plurality of branches link with each other. Further, the three-dimensional spaces (gaps) which are surrounded by the plurality of pores are provided sequentially, thereby structuring the carrier fine particles. Accordingly, the gap serves as the gas diffusion route (gas diffusion path) of oxygen, hydrogen and the like. FIG. 4 shows the gas diffusion route in FIG. 1. In FIG. 4, one example of the gas diffusion route (gas diffusion path) of gap 110 is shown.

Flow (gas diffusion route) 170 of oxidant (gas), fuel gas and the like can flow in the desired direction via the gap 110 as shown in FIG. 4. That is, the gap 110 serves as the gas diffusion route.

Here, as a simple structure of the carrier fine particles 150, the carrier fine particles can have only one pore (for example, the first pore surrounded by the branching points b1, b2, b5, b4, and b1). In such case, a gap 110 having a thickness of the crystallite grain of the crystallite 120 is provided. As a more simple structure, the carrier fine particles 150 can have one or more branches. In such case, the branches within the carrier fine particles 150 prohibits cohesion of the crystallites, thereby providing gap 110 between the crystallites.

Here, the "pore" mentioned above can also be mentioned as closed curve (closed loop). Otherwise, it can be said that a gap 110 surrounded by a closed plane including the afore-mentioned plurality of branching points (for example, branching points b1 to b7) is provided. As the branching points b1 to b7, the center of gravity of the crystallite of the metal oxide structuring the carrier fine particles 150 in which the branches connect with each other can be taken as the branching point, or an arbitrary point in the crystallite can be taken as the branching point.

The size of the crystallite 120 is preferably 1 to 30 nm, more preferably 5 to 15 nm. The size is, particularly for example, 1, 5, 10, 15, 20, 25, and 30 nm, and can be in the range between the two values exemplified herein. The size of the crystallite 120 (crystallite diameter) can be obtained in accordance with a Sheller formula using half-width in the XRD pattern peak.

The aggregate of the carrier fine particles 150 is in the form of a powder. Such aggregate is referred to as "carrier powder".

The mean particle size of the carrier fine particles 150 in the carrier powder is in the range of 0.1 μm to 4 μm, preferably in the range of 0.5 μm to 2 μm. The mean particle size of the carrier fine particles 150 can be measured with a laser diffraction/scattering particle size distribution analyzer.

The specific surface area of the carrier powder is preferably 12 $m^2/g$ or more, and is more preferably 25 $m^2/g$ or more. The specific surface area is, for example, 12 to 100 $m^2/g$, particularly for example, 12, 15, 20, 25, 30, 35, 40, 45, 50, 60, 70, 80, 90, or 100 $m^2/g$, and can be in the range between the two values exemplified herein.

Figure 5:
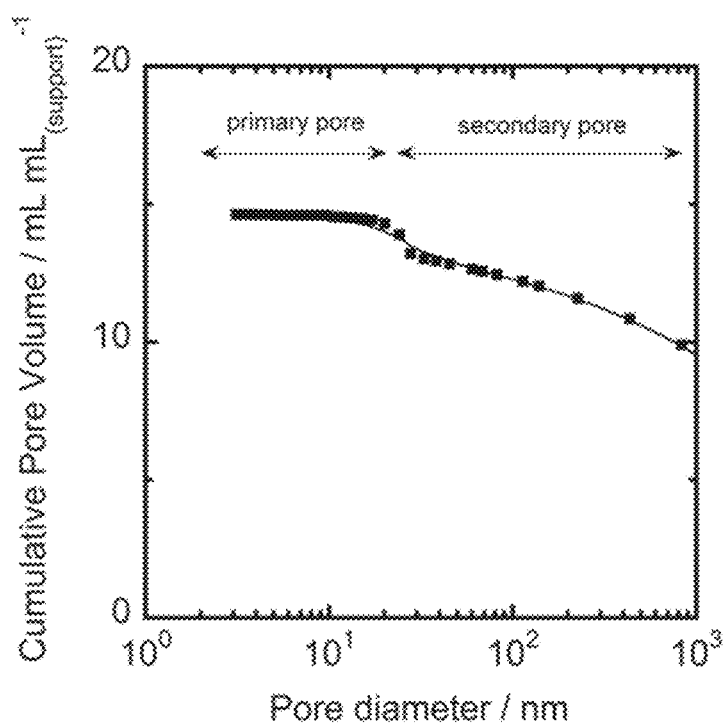
FIG. 5 shows one example of a distribution of gaps 110 contained in the carrier powder.

On example of the distribution of gap 110 contained in the carrier powder is shown in FIG. 5. Distribution of gap 110 can be obtained by measuring the volume of the three-dimensional gap of the carrier powder, using a mercury porosimetry. In FIG. 5, volume per one gap is obtained from the measured value of the volume and the number of the gaps, and then a diameter of a sphere is obtained by converting the volume obtained into a volume of a sphere (sphere equivalent diameter obtained by mercury press-in method). FIG. 5 shows a cumulative size distribution of the diameter of the sphere. As shown in FIG. 5, the carrier powder preferably has a gap of 11 nm or less (primary pore) and a gap of larger than 11 nm (secondary pore). As such, gas diffusion route in the catalyst layer of the fuel cell can be provided.

The carrier powder preferably has a porosity of 50% or more, and more preferably a porosity of 60% or more. The porosity is, for example, 50 to 80%, particularly for example, 50, 55, 60, 65, 70, 75, or 80%, and can be in the range between the two values exemplified herein. Porosity can be obtained by mercury press-in method or by FIB-SEM.

The carrier powder preferably has a repose angle of 50 degrees or less, and more preferably a repose angle of 45 degrees or less. In such case, the carrier powder has a similar flowability as flour, and thus handling is simple. The repose angle is, for example, 20 to 50 degrees, particularly for example, 20, 25, 30, 35, 40, 45, or 50, and can be in the range between the two values exemplified herein. The repose angle can be obtained by drop volume method.

The carrier fine particles 150 are doped with an element having a valence different from the valence of titanium. As the element having a valence different from the valence of titanium, at least one is selected from rare earth element represented by yttrium, group 5 element represented by niobium and tantalum, group 6 element represented by tungsten, and group 15 element represented by antimony. By doping with such element, the carrier fine particles can be provided with conductivity. Among such elements, group 5 element represented by niobium and tantalum, and group 6 element represented by tungsten are preferable, and tantalum, niobium and tungsten are especially preferable. Tantalum and tungsten are especially preferable due to their large solid solubility limit. Here, when non-doped, anatase phase of titanium oxide can be converted into rutile phase by heat treatment at approximately 500° C. On the other hand, replacement by solid solution of the dopant can raise the phase conversion temperature to 1000° C. or higher. Accordingly, when titanium oxide of carrier fine particles 150 contains a dopant, manufacture of the carrier fine particles 150 and carrier powder by the method described in "3. Method for Manufacturing Carrier Powder" would be especially meaningful.

Conductivity of the carrier powder is preferably 0.001 S/cm or higher, and is more preferably 0.01 S/cm or higher. The conductivity is, for example, 0.01 to 1000 S/cm, particularly for example, 0.01, 0.1, 1, 10, 100, or 1000 S/cm, and can be in the range between the two values exemplified herein.

Conductivity can be measured in accordance with the JIS standard (JIS K 7194).

The carrier fine particles 150 have a branch 160 comprising a chained portion which is structured by fusion bonding a plurality of crystallites 120 into a chain. The branch 160 itself has a nature to allow electrons to flow. As shown in FIGS. 1 to 4, the carrier fine particles 150 have a plurality of branches 160, and the branches connect with each other at branching points (b1 to b7), by which a network is structured. Electrons flow among the branches, thereby providing electrical conductivity. Accordingly, the branches 160 of the carrier fine particles 150 shown by the dotted line from point PO in FIG. 1 itself structures an electron conduction route (electron conduction path) 140.

In the present embodiment, the carrier fine particles 150 include titanium oxide, and the ratio of the titanium oxide contained in the metal oxide in the carrier fine particles 150 is preferably 50 mol % or more. This ratio is, particularly for example, 50, 60, 70, 80, 90, 95, or 100 mol %, and can be in the range between the two values exemplified herein.

The ratio of anatase phase/rutile phase of the titanium oxide in the carrier powder is 0.2 or lower. In such case, the characteristics of the rutile phase would appear strongly, resulting in higher thermodynamic stability and it becomes easier to provide conductivity when doped. The ratio is, particularly for example, 0, 0.05, 0.1, 0.15, or 0.2, and can be in the range between the two values exemplified herein. The ratio can be obtained by (peak intensity at 2θ=25.16 degrees)/(peak intensity at 2θ=27.24 degrees) in the XRD pattern. This is since the peaks at 2θ=25.16 degrees and 2θ=27.24 degrees are peaks derived from the presence of the anatase phase and the rutile phase, respectively.

1-2. Metal Fine Particles 130

The metal fine particles 130 are fine particles of metal or alloy which can function as a catalyst. The metal fine particles 130 include platinum. The mean particle size of the plurality of metal fine particles 130 supported on the carrier powder is preferably 3 to 10 nm, more preferably 3 to 10 nm. The mean particle size is, particularly for example, 1, 2, 3, 4, 5, 6, 7, 8, 9, 10, 11, 12, 13, 14, 15, 16, 17, 18, 19, or 20 nm, and can be in the range between the two values exemplified herein. When the mean particle size of the metal fine particles 130 is smaller than 3 nm, the metal fine particles would dissolve along with the progress of the electrode reaction. On the other hand, when the mean particle size of the metal fine particles 130 is larger than 10 nm, the electrochemical active area would become small, and thus the desired electrode property cannot be achieved. The mean particle size of the metal fine particles 130 can be obtained by measuring the diameter of the circumscribed circle of all the metal fine particles 130 in the TEM image of the carrier metal catalyst 100 (such as those shown in FIG. 6A and FIG. 6B), and then calculating the arithmetic mean of the measured diameter.

The metal fine particles 130 preferably comprise a core, and a skin layer covering the core. The core preferably comprises an alloy of a noble metal and a transition metal. The skin layer preferably comprises a noble metal. As the noble metal, platinum is preferable. As the transition metal, cobalt (Co) or nickel (Ni) are preferable, and cobalt is especially suitable.

The metal fine particles 130 preferably contain titanium as a solid solution, and the amount of titanium dissolved in the core is preferably larger than the amount of titanium dissolved in the skin layer. As such, when titanium is dissolved more in the core, activity of the core can be improved.

The amount of the metal fine particles being supported is preferably 1 to 50 mass %, more preferably 5 to 25 mass %. The amount being supported is, particularly for example, 1, 5, 10, 15, 20, 25, 30, 35, 40, 45, or 50 mass %, and can be in the range between the two values exemplified herein.

The electrochemical active area of the carrier metal catalyst 100 is preferably 20 m$^2$/g or more. This are is, for example, 20 to 200 m$^2$/g, and is, particularly for example, 20, 30, 40, 50, 60, 70, 80, 90, 100, 110, 120, 130, 140, 150, 160, 170, 180, 190, or 200 m$^2$/g, and can be in the range between the two values exemplified herein. The electrochemical active area can be obtained by cyclic voltammetry.

2. Fuel Cell 200

Figure 7:
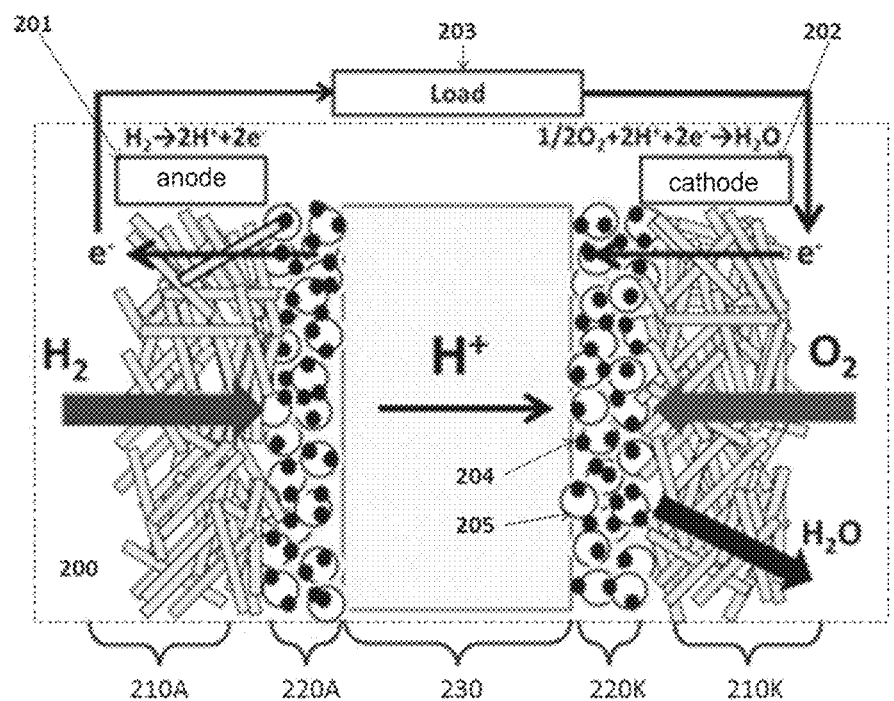
FIG. 7 is a model diagram of a fuel cell.
Figure 8:
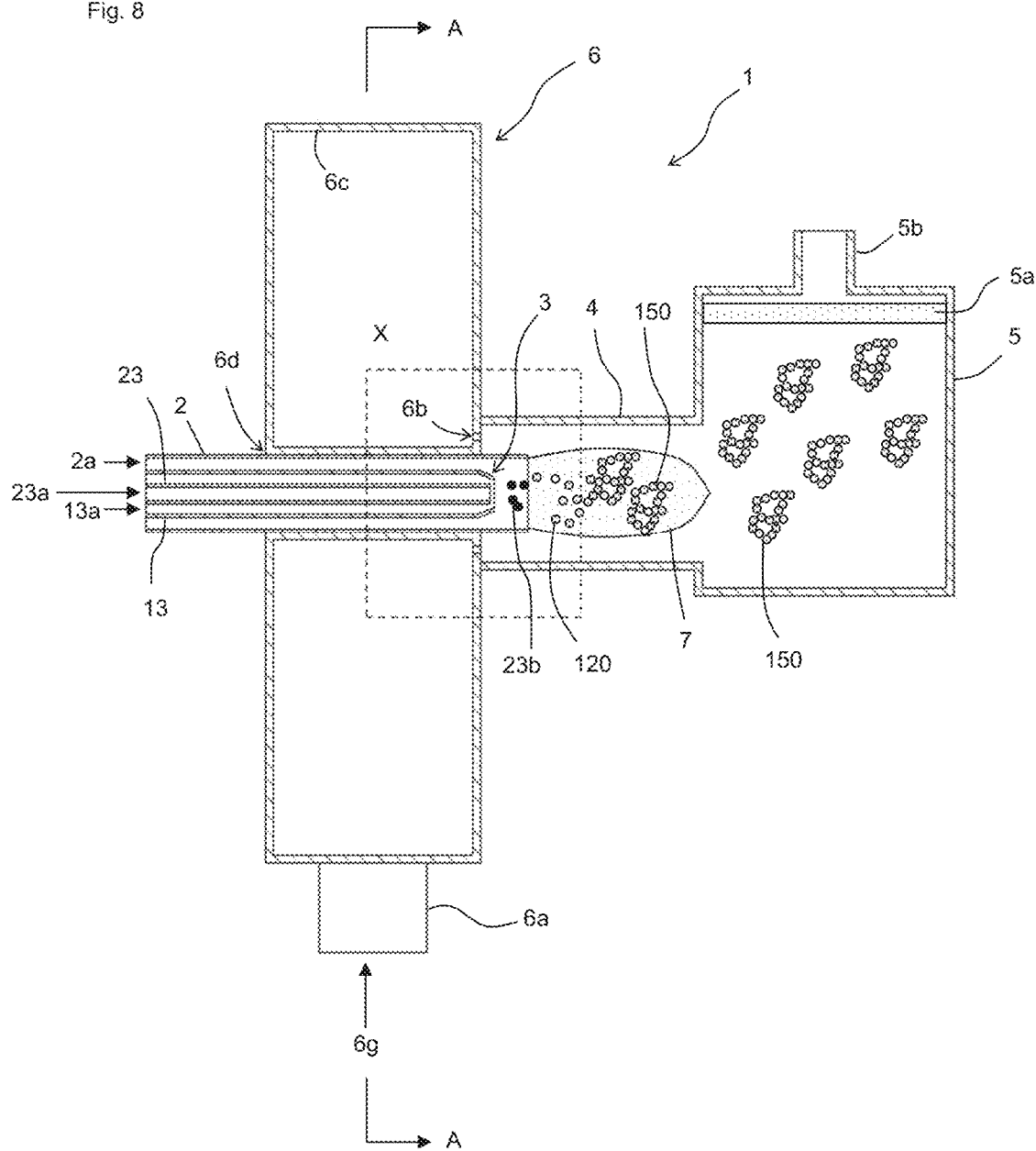
FIG. 8 is a sectional view which is cut through the center of burner 2 of a manufacturing apparatus 1 for manufacturing the carrier powder.
Figure 9:
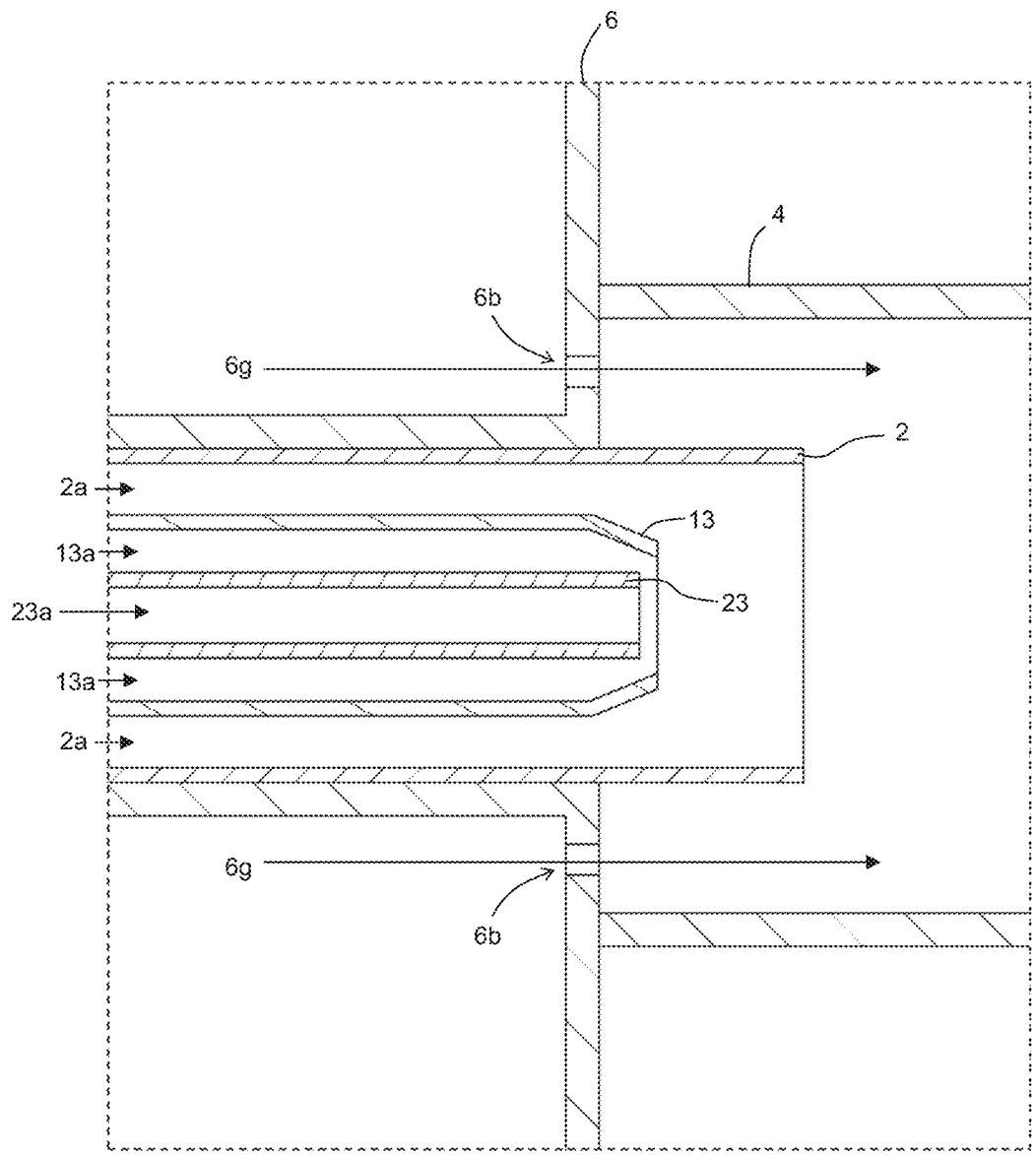
FIG. 9 is an enlarged view of region X in FIG. 8.
Figure 10:
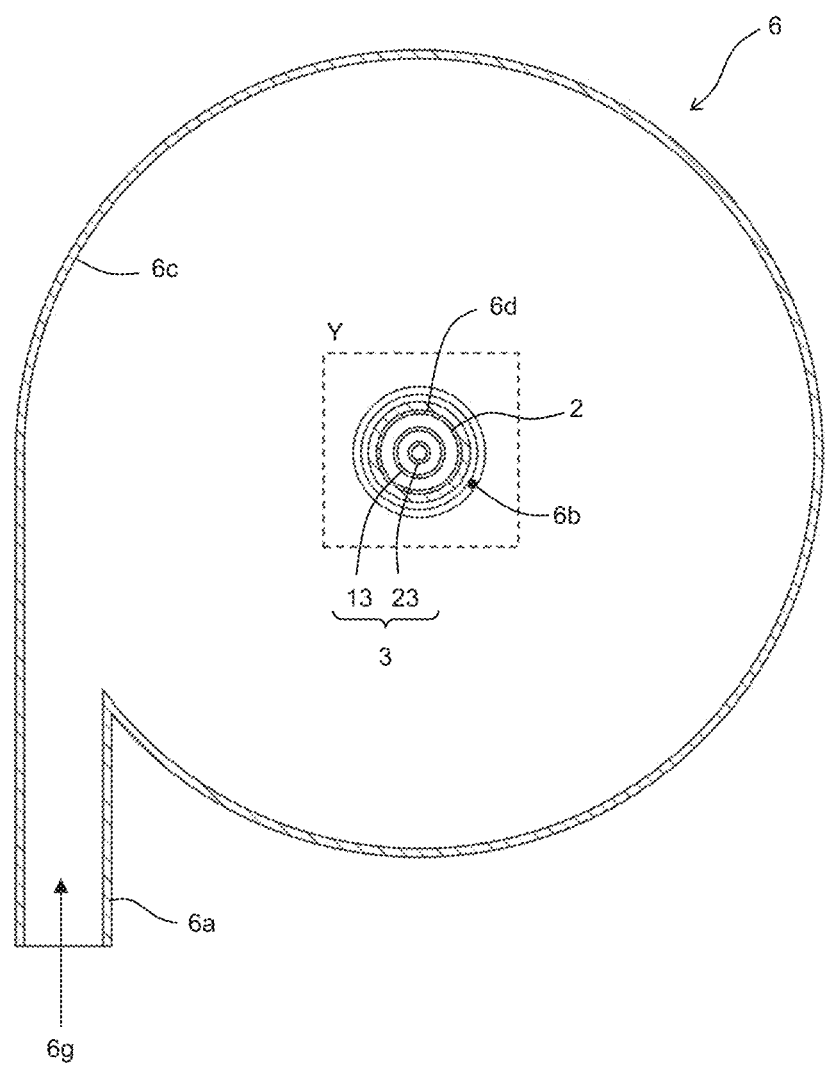
FIG. 10 is a sectional view taken along the line A-A of FIG. 8.
Figure 11:
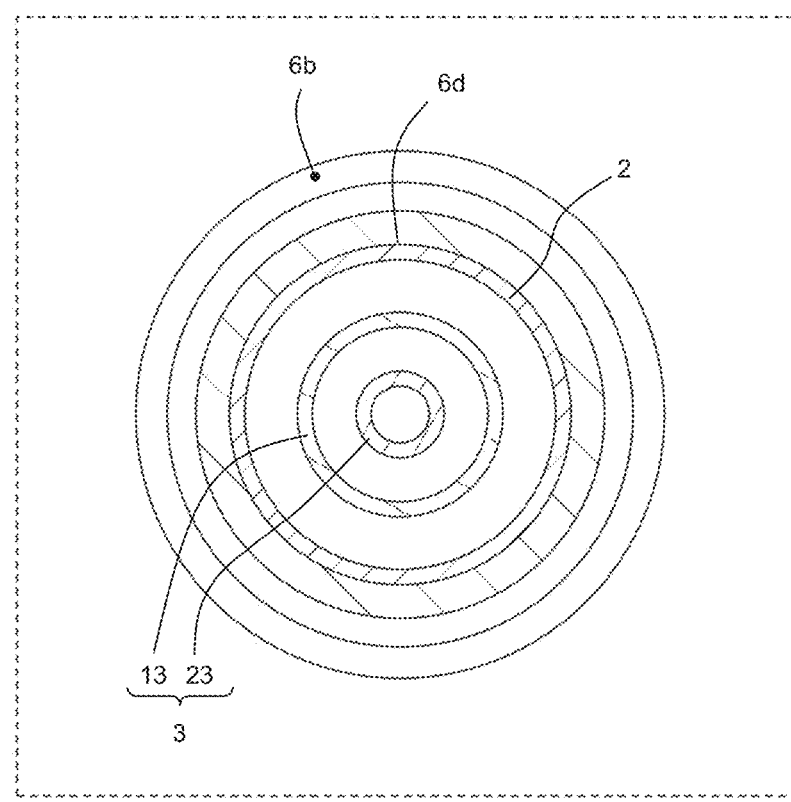
FIG. 11 is an enlarged view of region Y in FIG. 10.

A model diagram of the fuel cell according to the present invention is shown in FIG. 7. In FIG. 7, the fuel cell 200 is structured by aligning the catalyst layer 220A and the gas diffusion layer 210A on the anode 201 side, and the catalyst layer 220K and the gas diffusion layer 210K on the cathode 202 side, facing each other with the electrolyte membrane 230 in between. That is, the gas diffusion layer 210A on the anode side, the catalyst layer 220A on the anode side, the electrolyte membrane 230, the catalyst layer 220K on the cathode side, and the gas diffusion layer 210K on the cathode side are aligned in this order. By connecting the load 203 in between the anode 201 and the cathode 202 of the solid polymer electrolyte fuel cell 200, power is output to the load 203.

At least one of the catalyst layer on the anode side 220A and the catalyst layer on the cathode side 220K is preferably formed by the carrier metal catalyst 100. More preferably, the catalyst layer on the anode side 220A is formed by the carrier metal catalyst 100. The carrier metal catalyst 100 has a larger resistance under oxygen atmosphere than under hydrogen atmosphere. Therefore, when the carrier metal catalyst 100 is used for the catalyst layer on the anode side 220A, oxygen reduction reaction at the catalyst layer on the anode side 220A is suppressed when the fuel cell is started or terminated. Accordingly, even when the support of the catalyst layer on the cathode side 220K is carbon, the corrosion reaction thereof is suppressed, thereby suppressing degradation of the power generation performance of the fuel cell.

As the catalyst other than the carrier metal catalyst 100, catalysts disclosed in Patent Literature 1, catalysts prepared by allowing metal fine particles be supported on a support of ceramics other than titanium oxide (for example, tin oxide), catalysts prepared by allowing metal fine particles be supported on carbon support can be mentioned for example.

3. Method for Manufacturing Carrier Powder

First, referring to FIG. 8 to FIG. 11, the manufacturing apparatus 1 which can be used for the manufacture of the carrier powder is explained. The manufacturing apparatus 1 comprises a burner 2, a raw material supplying unit 3, a reaction cylinder 4, a collector 5, and a gas reservoir 6. The raw material supplying unit 3 comprises an outer cylinder 13, and a raw material distribution cylinder 23.

The burner 2 is a cylinder, and the raw material supplying unit 3 is arranged in the burner 2. Burner gas 2a is distributed between the burner 2 and the outer cylinder 13. The burner gas 2a is used to form a flame 7 at the tip of the burner 2 by ignition. A high temperature region having a temperature of 1000° C. or higher is formed by the flame 7. The burner gas 2a preferably contains a combustible gas such as propane, methane, acetylene, hydrogen, or nitrous oxide. In one example, a gas mixture of oxygen and propane can be used as the burner gas 2a. The temperature of the high temperature region is 1000 to 2000° C. for example, and is particularly for example, 1000, 1100, 1200, 1300, 1400, 1500, 1600, 1700, 1800, 1900, or 2000° C., and can be in the range between the two values exemplified herein.

A raw material solution 23a for generating the carrier powder is distributed in the raw material distribution cylinder 23. As the raw material solution 23a, the one containing a titanium compound is used. As the titanium compound, fatty acid titanium can be mentioned for example. The number of carbon atoms in the fatty acid is, for example, 2 to 20, preferably 4 to 15, and further preferably 6 to 12. As the fatty acid titanium, titanium octylate is preferable. The raw material solution 23a can contain a metal compound for doping the carrier fine particles 150. As the metal compound, fatty acid metal (Nb, Ta, W and the like) salt can be mentioned for example. The number of carbon atoms in the fatty acid is, for example, 2 to 20, preferably 4 to 15, and further preferably 6 to 12. As the fatty acid metal salt, niobium octylate, tantalum octylate, and tungsten octylate are preferable. The molar ratio of titanium compound: metal compound is arbitrarily determined to improve the conductivity of the carrier powder. Here, the molar ratio is preferably 0.8:0.2 to 0.99:0.01.

In the raw material solution 23a, the titanium compound is preferably dissolved or dispersed in a non-aqueous solvent. As the non-aqueous solvent, organic solvent represented by tarpen can be mentioned. When moisture is contained in the raw material solution 23a, the fatty acid titanium can undergo fatty hydrolysis and deteriorate. To prevent hydrolysis of the fatty acid titanium, the water content of the raw material solution 23a is preferably 100 ppm or lower, and more preferably 50 ppm or lower. By preventing hydrolysis of fatty acid titanium, ratio of the rutile phase in the titanium oxide can be improved.

Mist gas 13a used for converting the raw material solution 23a into a mist is distributed in between the outer cylinder 13 and the raw material distribution cylinder 23. When the mist gas 13a and the raw material solution 23a are jetted together from the tip of the raw material supplying unit 3, the raw material solution 23a is converted into a mist. The mist 23b of the raw material solution 23a is sprayed into the flame 7, and the titanium compound in the raw material solution 23a undergoes a thermal decomposition reaction in the flame 7. Accordingly, carrier powder which is an aggregate of carrier fine particles 150 having a chained portion structured by fusion bonding the crystallite 120 into a chain is generated. The mist gas 13a is oxygen in one example.

The reaction cylinder 4 is provided between the collector 5 and the gas reservoir 6. The flame 7 is formed in the reaction cylinder 4. The collector 5 is provided with a filter 5a and a gas discharging portion 5b. A negative pressure is applied to the gas discharging portion 5b. Accordingly, a flow which flows towards the gas discharging portion 5b is generated in the collector 5 and the reaction cylinder 4.

The gas reservoir 6 has a cylinder shape, and comprises a cold gas introducing portion 6a and a slit 6b. A cold gas 6g is introduced from the cold gas introducing portion 6a into the gas reservoir 6. The cold gas introducing portion 6a is directed in a direction along the tangential line of the inner peripheral wall 6c of the gas reservoir 6. Therefore, the cold gas 6g introduced through the cold gas introducing portion 6a into the gas reservoir 6 revolves along the inner peripheral wall 6c. At the center of the gas reservoir 6, a burner insertion hole 6d is provided. The burner 2 is inserted through the burner insertion hole 6d. The slit 6b is provided in the vicinity of the burner insertion hole 6d so as to surround the burner insertion hole 6d. Accordingly, when the burner 2 is inserted through the burner insertion hole 6d, the slit 6b is provided so as to surround the burner 2. The cold gas 6g in the gas reservoir 6 is driven by the negative pressure applied to the gas discharging portion 5b, and is discharged from the slit 6b towards the reaction cylinder 4. The cold gas 6g can be any gas so long as it can cool the titanium oxide generated, and is preferably an inert gas, for example, air. The flow speed of the cold gas 6g is preferably two times or more of the flow speed of the burner gas 2a. The upper limit of the flow speed of the cold gas 6g is not particularly limited, and is 1000 times the flow speed of the burner gas 2a for example. The ratio of flow speed of cold gas 6g/flow speed of burner gas 2a is 2 to 1000 for example, and the ratio is particularly for example, 2, 5, 10, 15, 20, 25, 30, 35, 40, 45, 50, 100, 200, 500, or 1000, and can be in the range between the two values exemplified herein. Here, in the present embodiment, a negative pressure is applied to the gas discharging portion 5b to allow the cold gas 6g to flow, however, a positive pressure can be applied to the gas introducing portion 6a to allow the cold gas 6g to flow.

In a case where the gas reservoir 6 is not provided, the outer air directly flows into the reaction cylinder from the gap between the burner and the reaction cylinder. Therefore, the outer air would turn into a turbulent flow in the reaction cylinder, thereby scattering mist, crystallite and carrier fine particles. Therefore, they cannot be sufficiently heated by the flame, thereby resulting in generation of titanium oxide having high ratio of anatase phase which is a metastable phase. On the other hand, in the present invention, the cold gas 6g is supplied in the surroundings of the flame 7 through the slit 6b, and thus the cold gas 6g flow around the flame 7 as a laminar air flow. Therefore, the mist 23b, crystallite 120, and the carrier fine particles 150 would not be scattered by the cold gas 6g, allowing them to move along the flame 7 and be heated sufficiently to progress the reaction. Accordingly, the ratio of the rutile phase of the titanium oxide in the carrier fine particles 150 can be increased. In addition, after the carrier fine particles 150 come out of the flame 7, the carrier fine particles 150 would be immediately cooled by the cold gas 6g, thereby allowing to maintain the structure having the chained portion. The carrier fine particles 150 after cooling would be trapped by the filter 5a and collected.

In the present invention, the carrier powder which is an aggregate of the carrier fine particles 150 can be manufactured by using the manufacturing apparatus 1. Here, a high-temperature region of 1000° C. or higher is formed at the tip of the burner 2 by the flame 7, and the titanium compound is allowed to undergo a thermal decomposition reaction in this high-temperature region while supplying the cold gas 6g through the slit 6b to the surroundings of the high-temperature region. The high-temperature region can be formed by plasma instead of the flame 7.

4. Method for Manufacturing Carrier Metal Catalyst 100

The method for manufacturing carrier metal catalyst 100 comprises a supporting step and a reduction step.

<Supporting Step>

In the supporting step, the metal fine particles 130 are supported on the carrier powder. Such supporting can be performed by a reverse micelle method, a colloidal method, an impregnation method and the like. In the colloidal method, the supporting step comprises an adsorption step and a heat treatment step.

In the adsorption step, the metal colloidal particles are adsorbed onto the carrier powder. More particularly, the metal colloidal particles synthesized by the colloidal method is dispersed in an aqueous solution to prepare a dispersion, and then the metal colloidal particles are added and mixed in the dispersion. Accordingly, the colloidal particles are adsorped onto the surface of the carrier powder. The carrier powder having the colloidal particles adsorped thereon is then filtered and dried, thereby being separated from the dispersion medium. The metal colloidal particles include platinum.

In the heat treatment step, the metal colloidal particles are subjected to a heat treatment at 920 to 1100° C. after the adsorption step, thereby converting the metal colloidal particles into the metal fine particles 130. The temperature of the heat treatment is, particularly for example, 920, 930, 940, 950, 960, 970, 980, 990, 1000, 1010, 1020, 1030, 1040, 1050, 1060, 1070, 1080, 1090, or 1100° C., and can be in the range between the two values exemplified herein.

The heat treatment time is, for example, 0.1 to 20 hours, preferably 0.5 to 5 hours. The heat treatment time is, particularly for example, 0.1, 0.5, 1, 2, 3, 4, 5, 6, 7, 8, 9, 10, 15, or 20 hours, and can be in the range between the two values exemplified herein.

Heat treatment can be carried out under an inert gas atmosphere such as nitrogen, or under an inert gas atmosphere containing 1 to 4% of hydrogen.

By performing the heat treatment step at such temperature, the followings can be achieved. (1) an effect to increase the ratio of rutile phase in the carrier powder; (2) an effect to achieve strong fusion of the metal fine particles 130 with the carrier fine particles 150; (3) an effect of improving conductivity of carrier metal catalyst by enlarging the $Ti^{3+}$ region formed in the vicinity of the metal fine particles 130

Here, (3) will be explained in further detail.

When the heat treatment is carried out at a temperature of 800° C. or higher, the Ti atom of the carrier powder would diffuse into the metal fine particles 130. Accordingly, the entirety of the metal fine particles 130 would become an alloy containing Ti and Pt (the content of Ti would be larger near the center and becomes smaller towards the outer side). Such condition is maintained up to approximately 900° C., however, when the temperature reaches 920° C. or higher, Pt would precipitate on the surface of the metal fine particles 130 to form a skin layer. When the skin layer of Pt is formed, oxygen easily come out of $TiO_2$ at its vicinity (refer to non-patent literature 1). As a result, the $Ti^{3+}$ region around the metal fine particles 130 would be enlarged, thereby increasing the conductivity of the carrier metal catalyst. When the heat treatment is carried out at 900° C. as in Patent Literature 1, the entirety of the metal fine particles 130 would become an alloy including Ti and Pt, and a skin layer of Pt would not be formed. Therefore, the $Ti^{3+}$ region hardly enlarges, and the conductivity could not be improved.

After the carrier powder is manufactured by the method disclosed in "3. Method for Manufacturing Carrier Powder" (hereinafter referred to as "flame method"), the carrier powder is preferably not subjected to heat treatment and the supporting step is carried out. The carrier powder manufactured by the flame method is mostly the rutile phase, however, there is a small portion of the anatase phase. When the supporting step is carried out with the carrier powder in this condition, the $Ti^{3+}$ region tends to become large. On the other hand, when the heat treatment is carried out after manufacturing the carrier powder by the flame method, the anatase phase would change into the rutile phase, and thus the expansion of the $Ti^{3+}$ region during the supporting step is suppressed. The heat treatment mentioned here is a heat treatment which changes the anatase phase into the rutile phase. The heat treatment temperature is, for example, 800 to 1000° C., particularly for example, 800, 810, 820, 830, 840, 850, 860, 870, 880, 890, 900, 910, 920, 930, 940, 950, 960, 970, 980, 990, and 1000° C., and can be in the range between the two values exemplified herein.

<Reduction Step>

In the reduction step, reduction treatment of the metal fine particles 130 is carried out after the heat treatment step. The reduction treatment can be carried out by performing a heat treatment under a reductive atmosphere containing a reductive gas such as hydrogen.

The temperature of this heat treatment is, for example, 70 to 300° C., preferably 100 to 200° C. This temperature is, particularly for example, 70, 80, 90, 100, 110, 120, 130, 140, 150, 160, 170, 180, 190, 200, 250, or 300° C., and can be in the range between the two values exemplified herein.

The heat treatment time is, for example, 0.01 to 20 hours, preferably 0.1 to 5 hours. The heat treatment time is, particularly for example, 0.01, 0.05, 0.1, 0.5, 1, 2, 3, 4, 5, 6, 7, 8, 9, 10, 15, or 20 hours, and can be in the range between the two values exemplified herein.

When the reductive gas is hydrogen, the density thereof is, for example, 0.1 to 100 volume %, preferably 0.2 to 10 volume %, and more preferably 0.5 to 3 volume %. This density is, particularly for example, 0.1, 0.2, 0.5, 1, 1.5, 2, 2.5, 3, 10, or 100 volume %, and can be in the range between the two values exemplified herein.

The metal fine particles 130 after the heat treatment in the supporting step can be in an oxidized condition. In such case, the metal fine particles 130 may not show catalyst activity. The catalyst activity can be increased by reducing the metal fine particles 130.

EXAMPLES

The carrier metal catalyst was manufactured in accordance with the method described below, and various evaluations were performed.

1. Manufacture of Carrier Metal Catalyst 100

Example 1

(Manufacture of Carrier Powder)

By using the manufacturing apparatus 1 shown in FIG. 8 to FIG. 11, carrier powder was manufactured. As the burner gas 2*a*, gas prepared by blending 5 L/min of oxygen and 1 L/min of propane gas was used. This gas was ignited to form a flame (chemical flame) 7 of 1600° C. or higher at the tip of the burner 2. The raw material solution 23*a* was prepared by blending titanium octylate and tantalum octylate by a molar ratio of 0.95:0.05, and then the blend was further combined with mineral spirit terpen and dissolved. Oxygen was used as the mist gas 13*a*. 9 L/min of the mist gas 13*a* and 3 g/min of the raw material solution 23*a* were blended and sprayed from the tip of the raw material supplying unit 3 which is a spray nozzle (atomizer) towards the center portion of the flame, thereby allowing combustion of the blend and generation of the carrier powder which is an aggregate of the carrier fine particles 150. During such, negative pressure was applied to the gas discharging portion 5*b* to suction air from slit 6*b* at a flow rate of 170 L/min, thereby collecting the generated carrier powder in the collector 5 (with filter 5*a*). The raw material supplying unit 3 comprises a double tube structure (overall length of 322.3 mm). Oxygen is supplied from the outer cylinder 13, and the raw material solution 23*a* is supplied to the raw material distribution cylinder 23. At the tip of the raw material distribution cylinder 23, a fluid nozzle and an air nozzle are provided, and the raw material solution 23*a* was converted into the mist 23*b* at this position. The amount of the carrier powder collected was 10 g or more when the operation was carried out for 60 minutes.

(Support and Reduction of Metal Fine Particles 130)

In accordance with the procedures in FIG. 12, metal fine particles 130 were supported onto the carrier powder.

First, 0.57 mL of chloroplatinic acid hexahydrate aqueous solution was dissolved in 38 ml of super pure water, followed by addition of 1.76 g of sodium carbonate, and then the mixture was agitated (Step S1 in FIG. 12).

The solution was diluted with 150 ml of water, and pH of the solution was adjusted to 5 with NaOH. Thereafter, 25 ml of hydrogen peroxide was added, and the pH was again adjusted to 5 with NaOH (Step S2 in FIG. 12).

To the dispersion, a dispersion prepared by dispersing 0.50 g of carrier powder in 15 mL of super pure water was added (Step S3 in FIG. 12), and the mixture was agitated for 3 hours at 90° C. (Step S4 in FIG. 12). The mixture was cooled to room temperature, and was then filtered. The residue was washed with super pure water and alcohol, and was then dried overnight at 80° C. The residue was further subjected to 2 hours of heat treatment in nitrogen at 950° C., thereby allowing the metal fine particles 130 to be supported on the carrier powder. Then, heat treatment was performed for 2 hours in 1% hydrogen at 150° C. to reduce the metal fine particles 130 (Step S5 in FIG. 12). With these procedures, carrier metal catalyst 100 having metal fine particles 130 supported on carrier powder was obtained.

Example 2

Carrier metal catalyst 100 was manufactured with a similar procedure as Example 1 except that $CoCl_2$ solution ($CoCl_2$ (available from KANTO CHEMICAL CO., INC.)/ 15 mL of super pure water) was added in a dropwise manner at 2 mL/min, and the solution was agitated in Step S2 in FIG. 12.

Comparative Example 1

Carrier metal catalyst 100 was manufactured with a similar procedure as Example 1 and Example 2 except that the heat treatment temperature in Step S5 was altered from 950° C. to 900° C.

2. Evaluation

<BET Specific Surface Area>

Specific surface area of the carrier powder of Example 1 was measured by BET, which turned out to be 60 $m^2/g$.

<XRD Pattern>

Figure 13A:
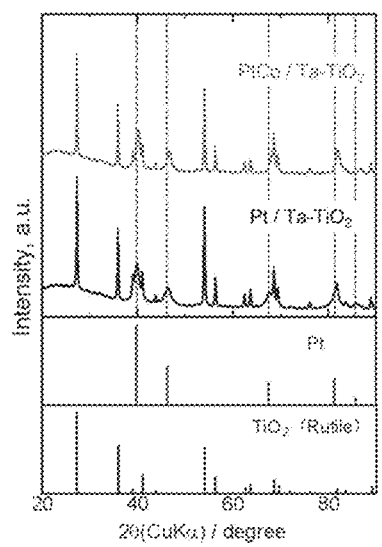
FIG. 13A is a XRD pattern of PtCo/Ta—$TiO_2$ and Pt/Ta—$TiO_2$.

Diffraction pattern obtained by XRD measurement of carrier metal catalyst 100 of Examples 1 to 2 are shown in FIG. 13A. An enlarged view of the vicinity of 35 to 55° is shown in FIG. 13B.

In the carrier metal catalyst 100 of Examples 1 and 2, only the peak derived from the rutile phase (2θ=27.24 degrees) was observed, and the peak derived from the anatase phase (2θ=25.16 degrees) was not observed. Further, when XRD pattern was measured for the carrier powder of Examples 1 and 2, peak derived from the anatase phase was observed, however, the intension was very weak. The ratio of anatase phase/rutile phase was 0.2 or lower.

Figure 13B:
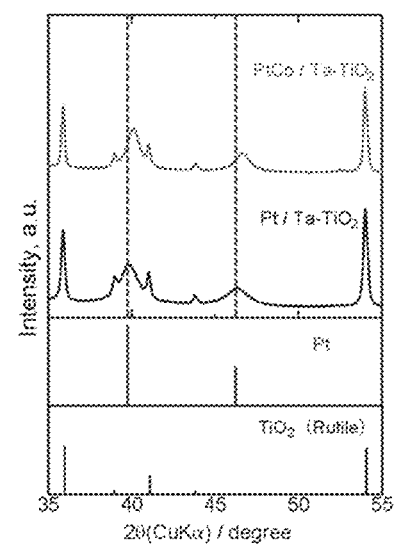
FIG. 13B is an enlarged view of the vicinity of 35 to 55° in FIG. 13A.

In addition, according to FIG. 13B, peak derived from Pt can be observed near 40° and 45°, in the diffraction pattern of Pt/Ta—$TiO_2$ (Example 1) and PtCo/Ta—$TiO_2$ (Example 2). These peaks are slightly shifted to the higher degree side from the peaks derived from pure Pt. Accordingly, it can be understood that when PtCo and Pt of the metal fine particles 130 are subjected to heat treatment, Ti, which is a constituting element of the carrier powder, becomes dispersed and dissolved in each of the metal fine particles 130, thereby forming alloys of PtCoTi and PtTi.

<Analysis by TEM Image>

Figure 6A:
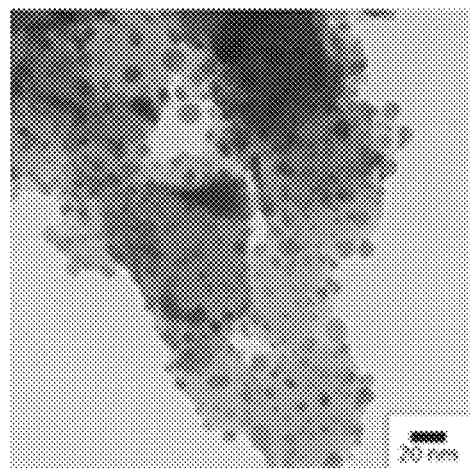
FIG. 6A is a TEM image of carrier metal catalyst 100 of Example 1.
Figure 6B:
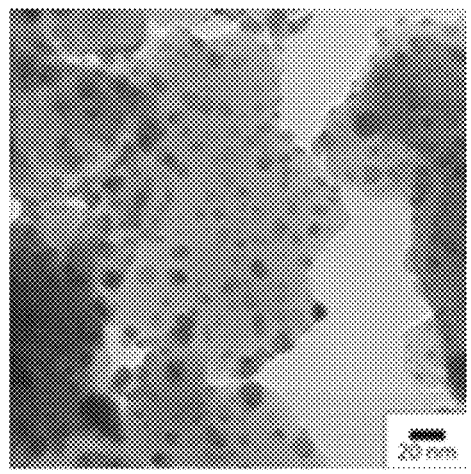
FIG. 6B is a TEM image of carrier metal catalyst 100 of Example 2.

TEM image of the carrier metal catalyst 100 of Examples 1 and 2 are shown in FIG. 6A and FIG. 6B, respectively. Diameter of the circumscribed circle of all the metal fine particles 130 in the TEM image of the carrier metal catalyst 100 shown in FIG. 6A and FIG. 6B were measured, and then the mean particle size of the metal fine particles 130 was calculated as their arithmetic mean. In Example 1, the mean particle size of the metal fine particles 130 was 6.9 nm, and the standard deviation was 2.7 nm. In Example 2, the mean particle size of the metal fine particles 130 was 7.8 nm, and the standard deviation was 3.0 nm.

<Preparation of Fuel Cell>

(Preparation of Anode Catalyst Ink)

First, 0.45 g of carrier metal catalyst 100 and Nafion were blended so that the volume ratio would be 0.7. Then this mixture, 1.98 g of 2-propanol, 2 g of water, and 20 balls of zirconium (5 mm diameter) were loaded into a pot made of zirconium (available from Fritsch Japan Co., Ltd, 45 $cm^3$ volume). The content was mixed for 30 minutes by a planetary ball mill (available from Fritsch Japan Co., Ltd, P-6, rotation number of 270 rpm). The mixture obtained by mixing with the planetary ball mill was further mixed for 2 hours by a mill pot rotating machine (available from NITTO KAGAKU CO., LTD., ANZ-61S, rotation number of 60 rpm). The mixture obtained was allowed to stand still for 24 hours in a cool box (12° C.). The mixture after left to stand still for 24 hours was further mixed for 1 hour by the mill pot rotating machine, and was subjected to re-dispersion treatment by an ultrasonic homogenizer (available from SMT CO., LTD., UH-50). The mixture obtained from the series of operation shall hereinafter referred to as "anode catalyst ink".

(Preparation of Cathode Catalyst Ink)

Further, mixture of Pt supported on carbon (Pt/GCB, TEC10EA50E, amount of Pt supported being 46 wt %, available from Tanaka Kikinzoku Kogyo), Nafion, ethanol, and water was prepared in a similar manner as the cathode catalyst ink. In particular, 0.45 g of Pt/GCB and Nafion were blended so that the volume of Nafion would be 0.7 with respect to the volume of Pt/GCB. Then this mixture, 3.96 g of ethanol as a volatile organic compound, 2 g of water, and 20 balls of zirconium (5 mm diameter) were loaded into a pot made of zirconium (available from Fritsch Japan Co., Ltd, 45 cm$^3$ volume). The content was mixed for 30 minutes by a planetary ball mill (available from Fritsch Japan Co., Ltd, P-6, rotation number of 270 rpm). The mixture obtained by mixing with the planetary ball mill was further mixed for 2 hours by a mill pot rotating machine (available from NITTO KAGAKU CO., LTD., ANZ-61 S, rotation number of 60 rpm). The mixture obtained was allowed to stand still for 24 hours in a cool box (12° C.). The mixture after being left to stand still for 24 hours was further mixed for 12 hours by the mill pot rotating machine, and was subjected to re-dispersion treatment by an ultrasonic homogenizer (available from SMT CO., LTD., UH-50). The mixture of Pt/CB and Nafion thus obtained from the series of operation shall hereinafter referred to as "cathode catalyst ink".

Pulse swirl spray method (PSS) was used for preparing the anode catalyst coating film (CCM, area: 4.4 cm$^2$). Atomization pressure was adjusted to 0.15 MPa, operation pressure was adjusted to 0.4 MPa, and the syringe pressure was adjusted to 0.1 MPa, and the temperature of the substrate was adjusted to 55° C. The anode catalyst ink was coated on the polymer electrolyte membrane (Nafion membrane) several times so that the amount of Pt supported would be approximately 0.5 mg-Pt/cm$^2$. Subsequently, the coating was dried in a thermostatic chamber at 60° C., thereby obtaining an anode CCM (a polymer electrolyte membrane having an anode catalyst layer formed on one side), amount of Pt supported being approximately 0.048 to 0.054 mg-Pt/cm$^2$.

On the other hand, PSS method was used also for the preparation of the CCM of Pt/GCB. The cathode catalyst ink was coated on the gas diffusion layer using a carbon paper (GDL, 25BCH, SGL, carbon group). Atomization pressure was adjusted to 0.15 MPa, operation pressure was adjusted to 0.4 MPa, and the syringe pressure was adjusted to 0.1 MPa, and the temperature of the substrate was adjusted to 55° C. The cathode catalyst ink was coated on the GDL several times so that the amount of Pt supported would be approximately 0.5 mg-Pt/cm$^2$. Subsequently, the coating was dried in a thermostatic chamber at 60° C. As a result, a cathode gas diffusion electrode (a gas diffusion layer having a cathode catalyst layer formed thereon) (GDE, catalyst layer area: 4.4 cm$^2$) was obtained.

In the CCM, the GDE was layered onto the surface of the polymer electrolyte membrane not having the anode catalyst layer coated thereon, so that the cathode catalyst layer comes into contact with the polymer electrolyte membrane. The gas diffusion layer (GDL) was further laminated onto the anode catalyst layer of the CCM, and hot pressing was performed (140° C., pressure of 10 kgf/cm$^2$) for 3 minutes. Accordingly, a membrane electrode assembly (MEA) prepared by laminating the cathode catalyst layer and the anode catalyst layer on the polymer electrolyte membrane so that the catalyst layers face each other, was obtained.

Each of the MEA obtained were used to structure a single cell, and was installed in a power generation evaluation device (FCE-1, available from Panasonic Production Technology).

<Measurement of I-V Characteristics and Cell Resistance>

Relation between current and voltage (I-V) was measured using an electronic load device (PLZ-664WA, available from Kikusui Electronics Corporation). Hydrogen was used as the anode (100 ml/min, atmospheric pressure), and hydrogen or air was used as the cathode with a flow rate of 100 ml/min and a pressure of atmospheric pressured. The temperature was kept at 80° C. Cell resistance was measured using a milli-ohm meter (Model 356E, available from Tsuruga Electric Corporation). The cell resistance obtained when the current density flowing through the load is 0.5 A/cm$^2$ is referred to as "cell resistance measured under standard conditions".

The result of measuring the I-V characteristics is shown in FIG. 14. The result obtained in the measurement of Pt/Ta—TiO$_2$ catalyst (Example 1), PtCo/Ta—TiO$_2$ catalyst (Example 2), and commercially available Pt/GCB catalyst for comparison are shown together. It can be understood that the I-V measurement results of Pt/Ta—TiO$_2$ catalyst and PtCo/Ta—TiO$_2$ catalyst compare favourably with the I-V measurement result of commercially available Pt/GCB catalyst. In addition, it can be understood that overvoltage is slightly suppressed in the I-V measurement result of PtCo/Ta—TiO$_2$ catalyst than in Pt/Ta—TiO$_2$ catalyst.

"Cell resistance measured under standard conditions" of the fuel cell prepared using the carrier metal catalyst 100 of Example 1 and Example 2 were measured. The results of measurement are shown in FIG. 14. The cell resistances were 0.069 Ω·cm$^2$ in both fuel cells, and is approximately the same as the cell resistance of the fuel cell prepared using commercially available Pt/GCB. This can be understood from the fact that the graphs in the lower region in FIG. 14 are almost overlapped. On the other hand, when the carrier metal catalyst 100 of Comparative Example 1, that is, Pt/Ta—TiO$_2$ catalyst and PtCo/Ta—TiO$_2$ catalyst subjected to heat treatment at 900° C. were used, the cell resistance of the fuel cells were 0.113 Ω·cm$^2$. Accordingly, it became obvious that a cell resistance measured under standard conditions of a fuel cell prepared using the carrier metal catalyst of 0.090 Ω·cm$^2$ or lower can be achieved by performing heat treatment at 950° C. That is, the carrier metal catalyst of the present invention and the fuel cell prepared by using the carrier metal catalyst can exhibit a superior effect so as to suppress the internal resistance of the fuel cell.

Figure 15:
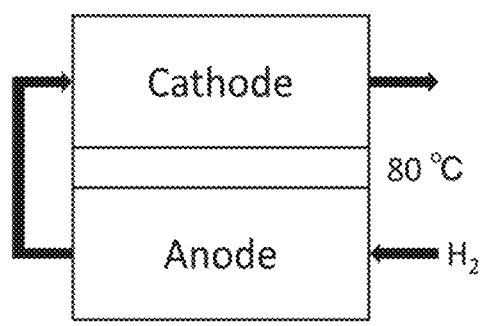
FIG. 15 shows an apparatus configuration of $H_2$ pump test.
Figure 16:
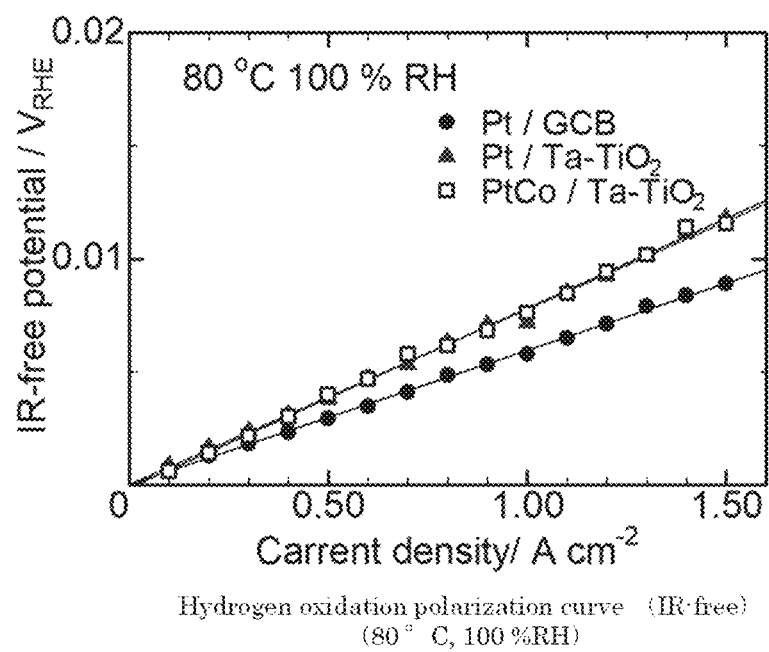
FIG. 16 shows a polarization curve of an anode.

In order to confirm the improvement in performance at the anode side, anode polarization measurement using H$_2$ pump test was performed. The H$_2$ pump test was performed with the cells used in the cell resistance measurement under the conditions shown in Table 1. Here, the hydrogen gas supplied to the anode was supplied to the cathode continuously (FIG. 15). The anode polarization curve of the cells using PtCo/Ta—TiO$_2$ catalyst, Pt/Ta—TiO$_2$ catalyst, and commercially available Pt/GCB catalyst for comparison are shown in FIG. 16. The anode polarization when the PtCo/Ta—TiO$_2$ catalyst was used was similar to the case where the Pt/Ta—TiO$_2$ catalyst was used, and the value of overvoltage was slightly higher than the case where Pt/GCB was used. This value was one tenth or less of the case where the carrier metal catalyst 100 was subjected to heat treatment at 900° C. and as Pt/Ta—TiO$_2$ catalyst and PtCo/Ta—TiO$_2$ catalyst. That is, improvement in the performance at the anode side was confirmed in the H$_2$ pump test for cases where heat treatment was performed at 950° C. Therefore, the present invention achieves an excellent effect so as to achieve improvement in the performance of the $H_2$ pump by applying the present invention in the $H_2$ pump.

Figure 17:
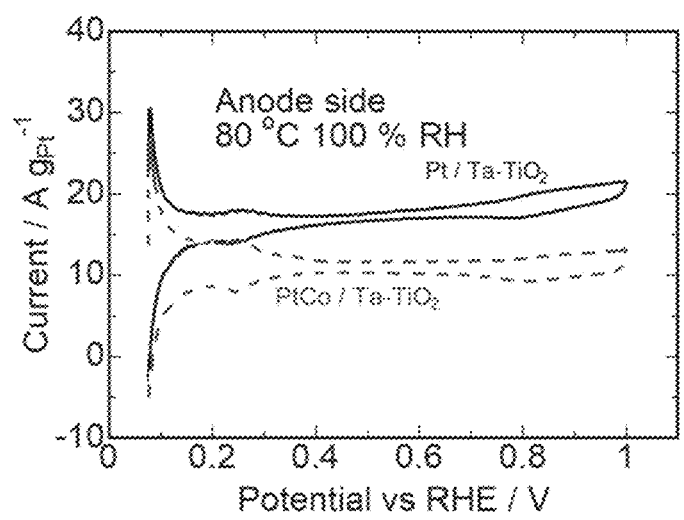
FIG. 17 shows a cyclic voltammogram of PtCo/Ta—$TiO_2$ catalyst and Pt/Ta—$TiO_2$ catalyst.

FIG. 17 shows a cyclic voltammogram of the PtCo/Ta—$TiO_2$ catalyst and Pt/Ta—$TiO_2$ catalyst. The electrochemical active area (ECA) obtained from FIG. 17 was 17.0 $m^2 g^{-1}$ for PtCo/Ta—$TiO_2$, and 17.2 $m^2 g^{-1}$ for Pt/Ta—$TiO_2$. The fact that Pt and PtCo both have similar ECA is an evidence that the outermost surfaces are covered with the same Pt skin layer. In addition, it can be understood that the waveform peak area from 0.6V to 1.0V associated with oxidation reduction of Pt is largely decreased compared with the area of the hydrogen adsorption/desorption wave. This indicates that the oxygen reduction reaction at the anode has greatly decreased. For example, this indicates that the oxygen reduction reaction at the anode is suppressed at starting/terminating of the fuel cell vehicle. As a result, the hydrogen generation reaction at the cathode and the reverse current of the proton are suppressed, thereby suppressing carbon degradation at the cathode. That is, the carrier metal catalyst of the present invention and the fuel cell using the carrier metal catalyst show an excellent effect so as to suppress cathode catalyst degradation caused by oxygen reduction reaction at the anode.

TABLE 1

| Condition of anode polarization measurement | | |
|---|---|---|
| | Anode | Cathode |
| Gas | | $H_2$ |
| Flow rate | | 1 L min$^{-1}$ |
| Retention time of step | | 5 min |

EXPLANATION OF SYMBOLS

1: manufacturing apparatus
2: burner
2a: burner gas
3: raw material supplying unit
4: reaction cylinder
5: collector
5a: filter
5b: gas discharging portion
6: gas reservoir
6a: cold gas introducing portion
6b: slit
6c: inner peripheral wall
6d: burner insertion hole
6g: cold gas
7: flame
13: outer cylinder
13a: mist gas
23: raw material distribution cylinder
23a: raw material solution
23b: mist
100: carrier metal catalyst
110: gap
120: crystallite
130: metal fine particles
150: carrier fine particles
160: branch
200: solid polymer fuel cell
201: anode
202: cathode
203: load
210A: gas diffusion layer on the anode side
210K: gas diffusion layer on the cathode side
220A: catalyst layer
220A: catalyst layer on the anode side
220K: catalyst layer on the cathode side
230: electrolyte membrane

The invention claimed is:

1. A method for manufacturing a carrier metal catalyst, comprising:
   a supporting step including an adsorption step and a heat treatment step;
   the adsorption step includes allowing metal colloidal particles to be adsorbed on a carrier powder;
   a metal of the metal colloidal particles includes platinum;
   the carrier powder is an aggregate of carrier fine particles;
   the carrier fine particles include a chained portion structured by a plurality of crystallites being fusion bonded to form a chain;
   the carrier fine particles include titanium oxide;
   the carrier fine particles are doped with an element having a valence different from a valence of titanium;
   the titanium oxide of the carrier powder has an anatase phase/rutile phase ratio of 0.2 or lower; and
   the heat treatment step includes performing a heat treatment at 920 to 1100° C. after the adsorption step to convert the metal colloidal particle into the metal fine particles.

2. The method of claim 1, wherein:
   the carrier powder is generated via a carrier powder generation step;
   the carrier powder generation step includes thermal decomposition reaction of titanium compound at a high-temperature region of 1000° C. or higher, thereby generating the carrier powder which is the aggregate of carrier fine particles;
   the carrier powder generation step is carried out while supplying a cold gas to a surroundings of the high-temperature region through a slit provided to a cylinder-shaped gas reservoir;
   the gas reservoir is provided with a cold gas introducing portion which introduces the cold gas into the gas reservoir; and
   the cold gas introducing portion is structured so as to allow the cod gas to be introduced through the cold gas introducing portion into the gas reservoir revolves along an inner peripheral wall of the gas reservoir.

* * * * *